Figure 1:
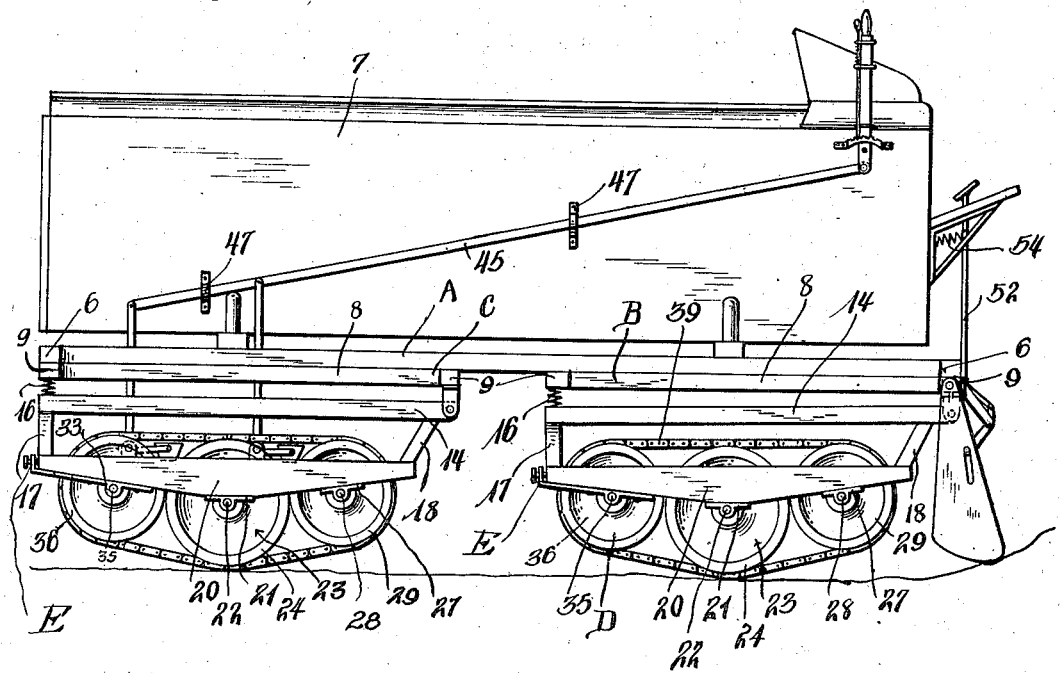

G. C. BERLIN.
DRIVING GEAR.
APPLICATION FILED MAR. 16, 1911.

1,062,318.

Patented May 20, 1913.

2 SHEETS—SHEET 1.

Witnesses

Inventor
George C. Berlin
By
Attorneys

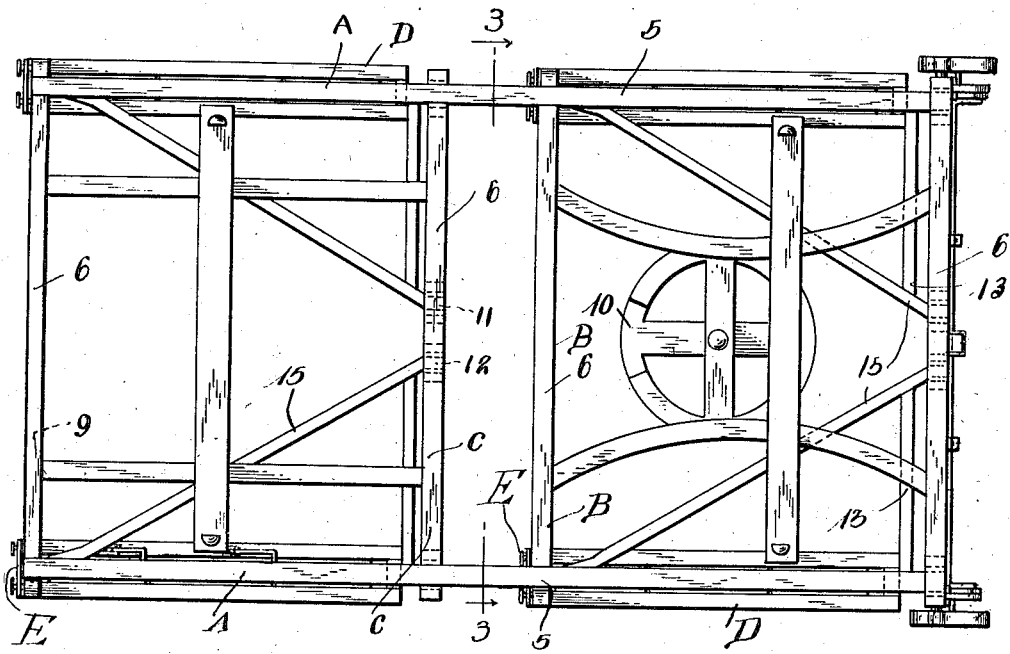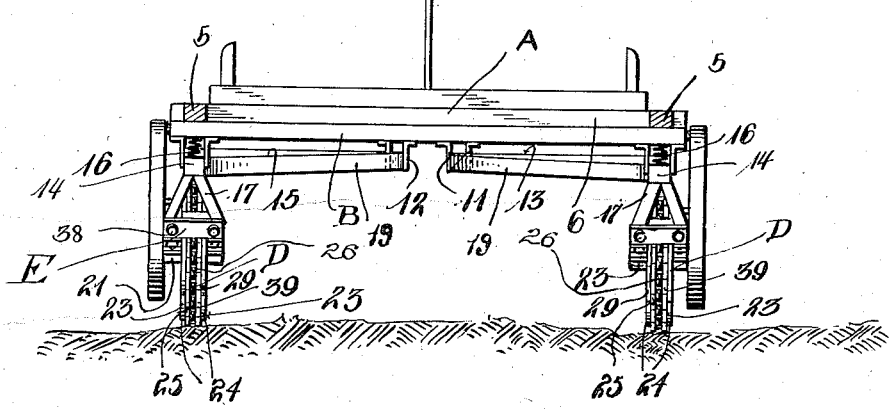

UNITED STATES PATENT OFFICE.

GEORGE C. BERLIN, OF CALDWELL, IDAHO.

DRIVING-GEAR.

1,062,318.  Specification of Letters Patent.  Patented May 20, 1913.

Application filed March 16, 1911. Serial No. 614,921.

*To all whom it may concern:*

Be it known that I, GEORGE C. BERLIN, a citizen of the United States, residing at Caldwell, in the county of Canyon, State of Idaho, have invented certain new and useful Improvements in Driving-Gears; and I do hereby declare the following to be a full, clear, and exact description of the invention, such as will enable others skilled in the art to which it appertains to make and use the same.

This invention relates to an improvement in driving gears for vehicles generally, although the invention is more particularly designed to be used in connection with farm wagons.

The principal object of the invention is to provide a gear for the purpose described which when attached to a farm wagon will constitute what is known as a low farm wagon.

Another object of the invention is to provide a gear which includes an endless rotating tire which is arranged in such a manner that the wagon can be easily moved over ditches or obstacles without any unnecessary jar to the wagon body.

A further object of the invention is to provide a wheel supporting frame, which is pivotally connected at its front end and resiliently retained at its rear end, whereby the jars incident to the passage over rough ground will be greatly reduced.

A still further object of the invention is to provide a driving gear for the purpose described, which can be easily applied to or detached from any wagon now in use.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings: Figure 1 is a side elevation of a wagon body illustrating my invention, Fig. 2 is a top plan view of the running gear, and Fig. 3 is a transverse sectional view taken on the line 3—3 of Fig. 2.

Like reference numerals designate corresponding parts in all the figures of the drawings.

Referring to the drawings, the invention comprises a main frame A consisting of longitudinal sills 5—5 and transverse connecting end sills 6—6. Suitably supported upon this frame is a wagon body 7. Disposed below and secured to the main frame are spaced front and rear supplemental frames B and C. Each of these frames consists of longitudinal frame members 8—8 and transverse members 9—9. Disposed between the supplemental frame B and the main frame A is a fifth-wheel 10 of any suitable construction. Depending from the front transverse member 9 of each supplemental frame are spaced pairs of brackets 11 and 12 respectively. Hingedly connected to these brackets is a plurality of driving mechanisms, each mechanism being indicated as a whole by the reference letter D. Inasmuch as the construction of each mechanism is identical, the description of one is deemed to be sufficient.

Each driving mechanism includes a frame consisting of an end member 13, a longitudinal member 14, and a member 15 which connects the ends of the first mentioned members. This frame is disposed below and at one side of one of the supplemental frames, and the transverse member 13 thereof is pivotally connected by any suitable means to the contiguous brackets before mentioned. Interposed between the rear end of the longitudinal member 14 and the supplemental frame is a coil spring 16. Depending from either end of the longitudinal member 14 are diverging legs 17 and 18 respectively. The lower ends of these legs are connected to a tractor wheel carrying frame, which includes transverse members 19 and longitudinal members 20. Bearings 21 are centrally mounted on each member 20, and journaled in said bearings is an axle 22 upon which is mounted a tractor wheel 23. This tractor wheel is provided with opposed flanges 24—24 forming a consequent recess 25. Integral with said wheel and projecting upwardly into said recess is a plurality of sprocket teeth 26. Also mounted on the members 20 at the forward ends thereof are bearings 27 in which is journaled a shaft 28, upon which is mounted a wheel 29 similar in construction to the wheel 23 above referred to, but having a smaller diameter.

Mounted below the rear ends of the longitudinal members 20 is a tensioning device which is indicated as a whole by the reference letter E. An axle 35 is journaled in the tensioning device, and mounted upon the axle is a wheel 36 which is similar in construction and preferably of the same size as the wheel 29. Engaged with the sprocket teeth 26 thereof is a sprocket chain 39, this chain being adapted to engage the ground below the center wheel 23. It will furthermore be observed that by means of this driving gear any jar, incident to the passing over stones and the like, will be prevented from passing to the body by means of the coil spring 16, which permits of said driving frames having a resilient connection.

A draft-pole (not shown) may be suitably connected to the supplemental frame B by any well known means, and to this pole may be attached draft animals for drawing the wagon along the ground.

What is claimed is:

A vehicle comprising in combination, a main frame, front and rear supplemental frames secured thereto, pairs of driving elements respectively connected at its forward end to each supplemental frame for vertical movements, and compression springs disposed intermediate the rear ends of each supplemental frame and the driving elements, each element consisting of an end member, a longitudinal member, a diagonal member connecting the first mentioned members, diverging legs depending from either end of the longitudinal member, a frame connected to the lower ends of said legs including spaced longitudinal members a plurality of tractor wheels disposed between and journaled in the last mentioned longitudinal members, and an endless belt operating over said wheels.

In testimony whereof, I affix my signature, in presence of two witnesses.

GEORGE C. BERLIN.

Witnesses:
HENRY J. ZEH,
ERNEST L. SHAW.